United States Patent
Smith et al.

(10) Patent No.: US 8,046,768 B2
(45) Date of Patent: Oct. 25, 2011

(54) APPARATUS AND METHOD FOR DETECTING RESOURCE CONSUMPTION AND PREVENTING WORKLOAD STARVATION

(75) Inventors: Gary S. Smith, Auburn, CA (US); Milford L. Hazlet, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1120 days.

(21) Appl. No.: 11/888,773

(22) Filed: Jul. 31, 2007

(65) Prior Publication Data

US 2009/0037923 A1  Feb. 5, 2009

(51) Int. Cl.
*G06F 9/46* (2006.01)

(52) U.S. Cl. .......... 718/104; 710/52; 710/240; 710/241; 711/130; 711/118

(58) Field of Classification Search .................. 718/104, 718/103
See application file for complete search history.

(56) References Cited

U.S. PATENT DOCUMENTS

| | | | |
|---|---|---|---|
| 6,745,286 B2 * | 6/2004 | Staub et al. | 711/114 |
| 6,895,585 B2 | 5/2005 | Smith | |
| 7,519,725 B2 * | 4/2009 | Alvarez et al. | 709/232 |
| 7,617,304 B2 * | 11/2009 | Devarakonda et al. | 709/223 |
| 2004/0215821 A1 * | 10/2004 | Regan et al. | 709/240 |
| 2004/0216103 A1 * | 10/2004 | Burky et al. | 718/100 |
| 2006/0253471 A1 | 11/2006 | Wasserman et al. | |
| 2008/0091883 A1 * | 4/2008 | Cox et al. | 711/130 |

* cited by examiner

*Primary Examiner* — Meng An
*Assistant Examiner* — Louis Diep

(57) ABSTRACT

In an embodiment of the invention, an apparatus and method for detecting resource consumption and preventing workload starvation, are provided. The apparatus and method perform the acts including: receiving a query; determining if the query will be classified as a resource intense query, based on a number of passes by a cache call over a data blocks set during a time window, where the cache call is associated with the query; and if the query is classified as a resource intense query, then responding to prevent workload starvation.

26 Claims, 5 Drawing Sheets

APPARATUS AND METHOD FOR DETECTING RESOURCE CONSUMPTION AND PREVENTING WORKLOAD STARVATION

TECHNICAL FIELD

Embodiments of the invention relate generally to an apparatus and method for detecting resource consumption and preventing workload starvation.

BACKGROUND

A server (e.g., database) in a network can receive queries from one or more client devices (e.g., computers) that are connected to the network. A query may be, for example, a request to search or retrieve some data that is stored in the server. A process in the server will process and service the queries that are received by the server. When concurrent queries are sent to the server, the queries compete for system resources in the server, such as, for example, CPU (central processing unit) resources, data access, and data transport.

System schedulers in the server are used in conjunction with a priority of each query to maximize the utilization of the system resources and to reduce the query response time. System schedulers can under utilize the system resources, but have the advantage of ensuring a predictable query response time. Resource governors may also be used to automatically end a query that exceeds system resources that are allocated for the query. However, such resource threshold controls are generally difficult to maintain, and can incorrectly end a business-critical query.

The SQL query will typically access and process one or more rows which reside in one or more tables. Complex queries that join rows together across multiple tables can process large numbers of rows. Many queries are bounded in the number of rows they can process, and cannot consume system resources beyond the bounded limit. For example, a query which aggregates a column value over a single table will make a single pass over the rows of the target table.

A query which requires multiple passes over the same data set has the potential to consume system resources for an extended period of time. This is often a reasonable solution for the query, especially when the data set subject to multiple passes is compact or the number of passes over the data is limited. In some cases, the query plan which performs multiple passes over the same data set can consume system resources for an extended period of time. Such a query is typically the result of poor plan quality, and remedial action is required. This includes ending the offending query, and updating the table statistics to ensure poor cardinality is eliminated prior to query execution.

A problem that can occur in previous approaches is that a resource intense query has continued to consume system resources without any limits. These conditions can lead to a starvation situation, where other queries at the same or lower data-access priority are either starved or significantly slowed. Therefore, the current technology suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
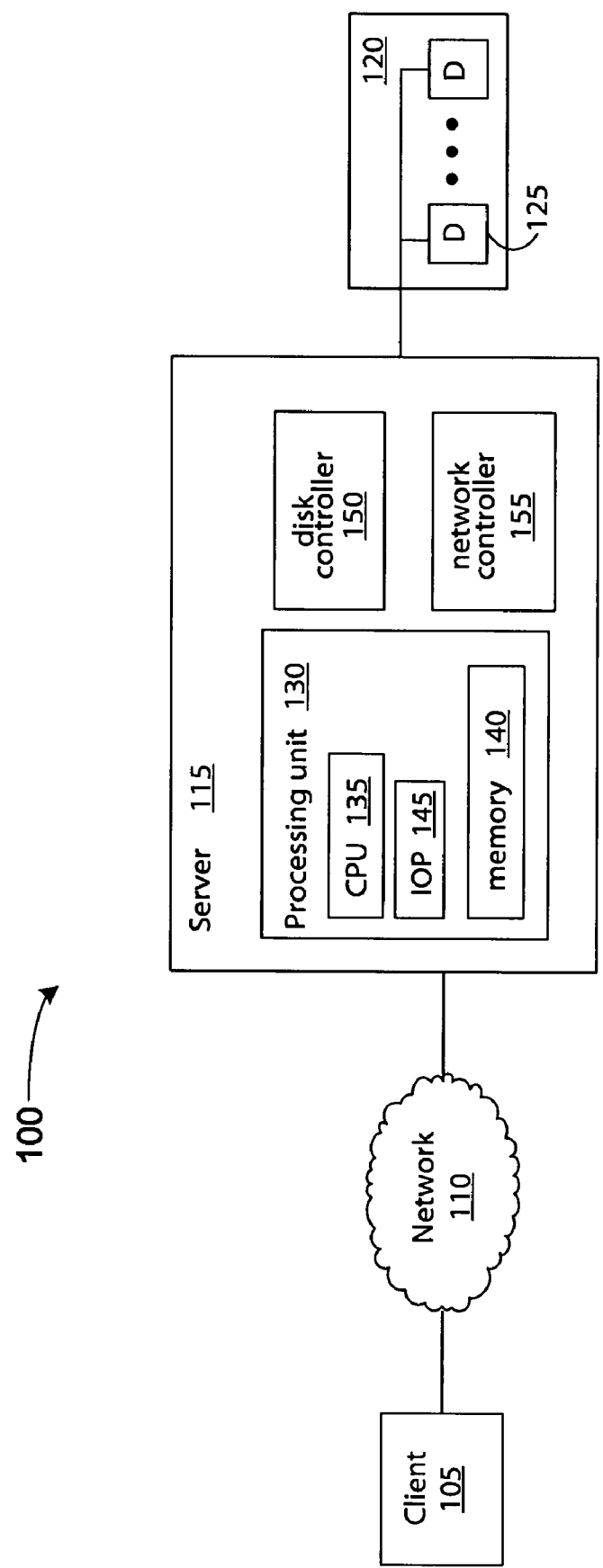
FIG. 1 is a block diagram of a system in accordance with an embodiment of the invention.

FIG. 1 is a block diagram of an apparatus (system) 100 in accordance with an embodiment of the invention. One or more clients 105 (e.g., computers) communicates via network 110 with a server 115. The server 115 is connected to one or more storage volumes 120 which may be formed by, for example, storage disks 125. The configuration of the disks in the storage volumes 120 are well known to those skilled in the art. The network 110 can be, for example, a public network such as the Internet or a private network such as a local area network.

The server 115 typically includes a processing unit 130 which are typically grouped in pairs of processing units as disclosed in commonly-assigned U.S. Pat. No. 6,895,585, which is hereby fully incorporated herein by reference. A processing unit 130 includes a CPU 135, a memory 140, and input/output processor (IOP) 145. For purposes of clarity in the drawings, the specific hardware implementation details such as, for example, bus lines and other known elements are omitted in the server 115 of FIG. 1. A disk controller 150 permits the server 115 to communicate with the storage volume 120, and a network controller 155 permits the server 115 to communicate across the network 110. The controllers 150 and 155 may include the disk drivers and network drivers, respectively, that are typically required for data transmissions between devices.

Figure 2A:
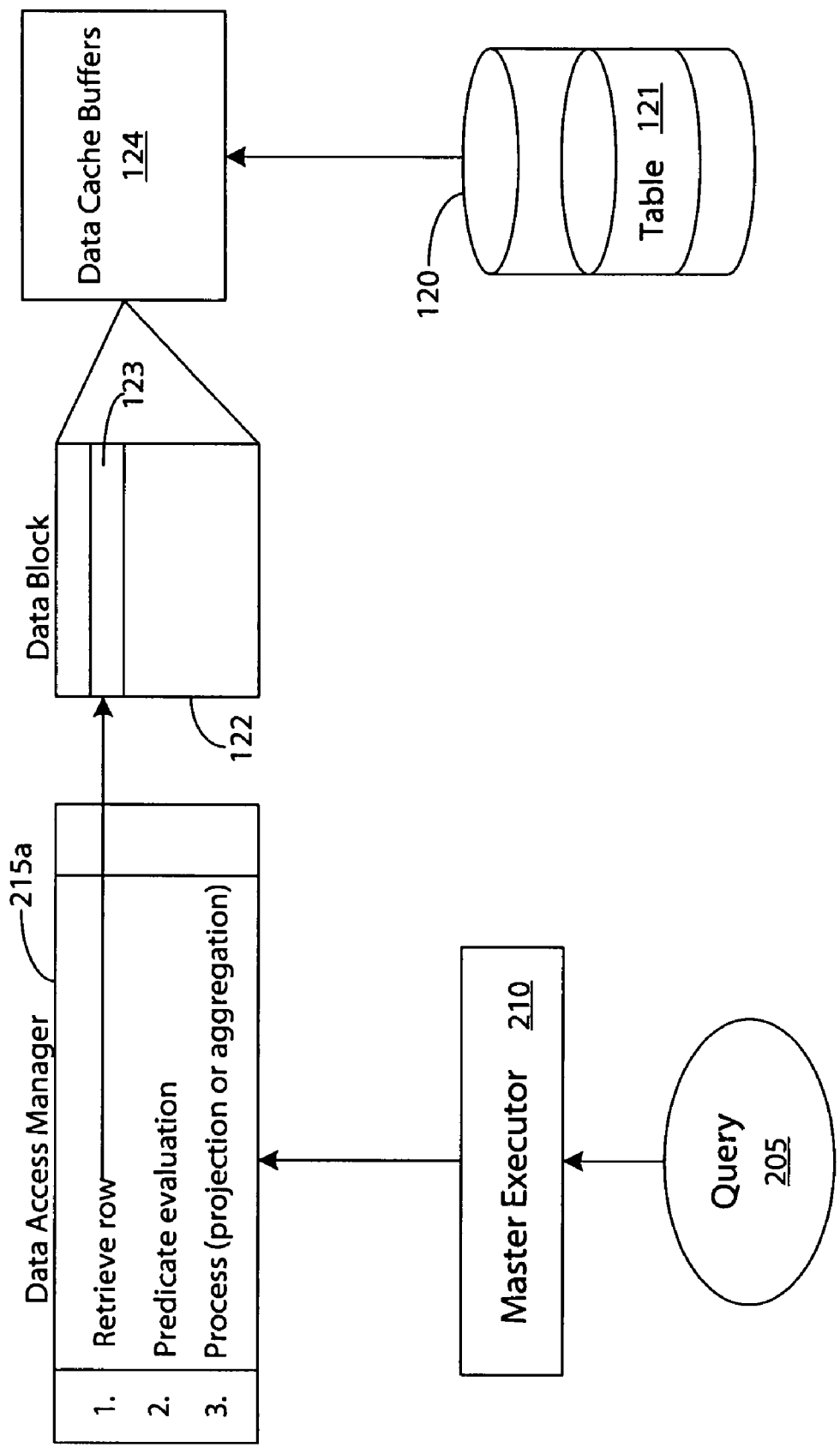
FIG. 2A is a block diagram that shows a data flow in a system that receives a resource intense query, as detected by an embodiment of the invention.

FIG. 2A is a block diagram that shows a data flow in a system that receives a resource intense query, as detected by an embodiment of the invention. The software elements in the system 200 are typically implemented in the memory 140 (FIG. 1) of the server 115. One or more queries 205 can be initiated by a user of a client device 105 (FIG. 1) or can be a scheduled query that is sent from a client device 105. A query 205 may be, for example, an SQL (Structured Query Language) query which is based on a computer language that is designed for the retrieval and management of data in relational database management systems, database schema creation and modification, and database object access control management. As mentioned above, a query 205 can be, for example, a request to search or retrieve some data that is stored in a storage area (e.g. volume 120) that is associated with server 115. When the queries 205 are received by the server 115, the queries 205 are typically initially compiled by standard higher layer software in the server 115. These higher layer software elements may gather statistics that are associated with the queries 205.

A master executor 210 would then request the service of a data access manager 215 which provides data access services to the storage volume 120.

A table 121 in storage volume 120 has multiple data blocks 122. As discussed with reference in FIG. 1, multiple storage devices are typically distributed across the storage volume 120. Each data block 122 contains one or more rows 123 of data. The data access manager 215a performs certain standard data access services such as: (1) row retrieval, (2) predicate evaluation (values of interest are extracted from a candidate row and evaluated against the predicate), and (3) process (projection or aggregation). A query 205 that is classified as a resource intense query results in cache calls which represent passes over the rows 123 within the data block associated with the cache call. In other words, a resource intense query will cause the data access manager 215a to process each data block 122 in the table 121, at multiple times.

Figure 2B:
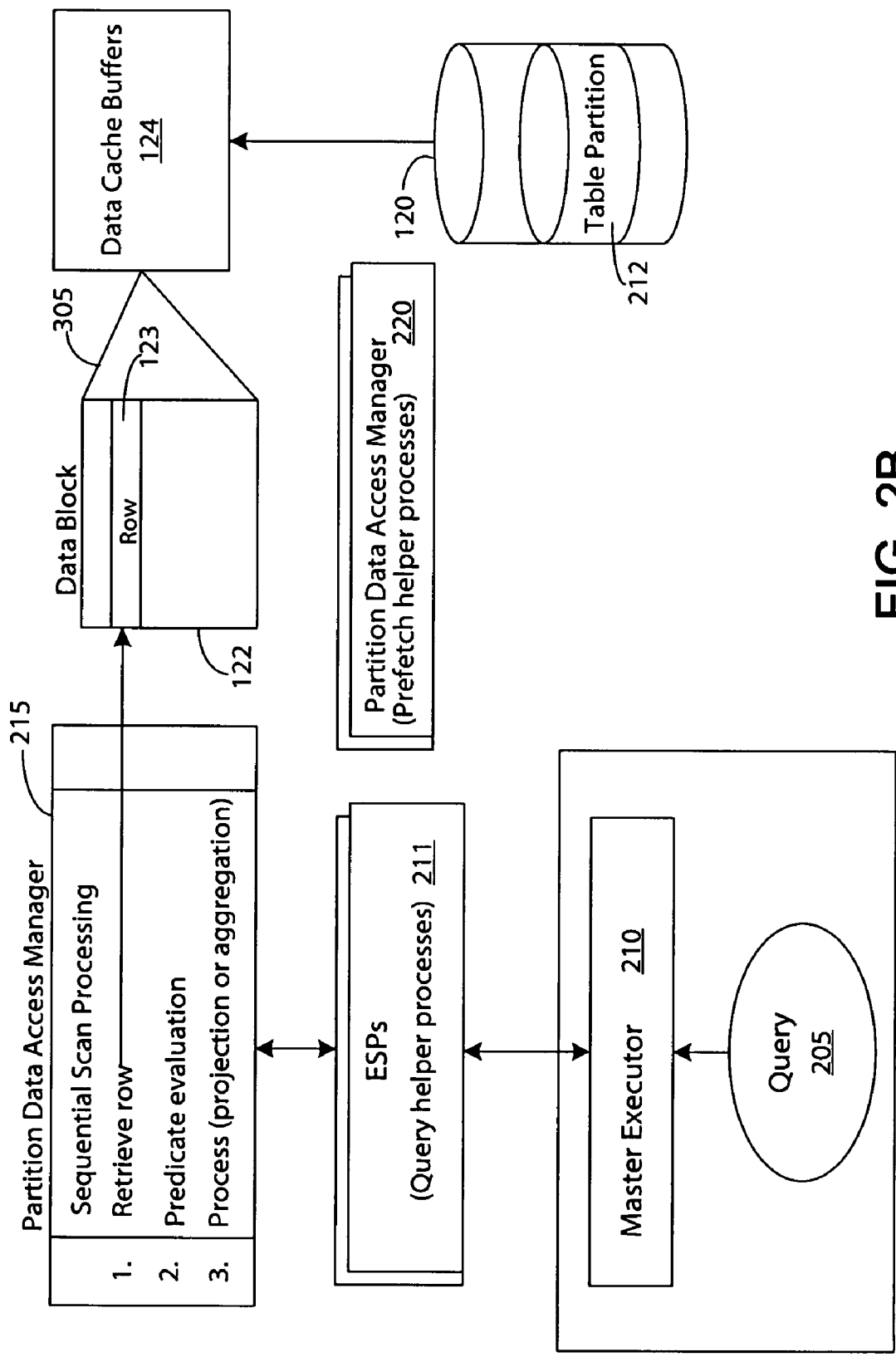
FIG. 2B is a block diagram that shows a data flow in a system that receives a resource intense parallel query, as detected by an embodiment of the invention.

FIG. 2B is a block diagram that shows a data flow in a system that receives a resource intense parallel query, as detected by an embodiment of the invention. Query helper processes (ESPs) 211 are multiple executor processes. Each query helper process accesses all table partitions 212 (i.e., an example of partition 212 is the data blocks set 310 in FIG. 3). A table partition 212 can be one table 121 or a set of tables. Examples of accesses to partitions (data blocks sets) are discussed below in FIG. 3.

The partition data access manager 215 performs standard sequential scan processing including: (1) retrieving the next row, (2) predicate evaluation, and (3) processing (projection or aggregation). When the partition data access manager 215 processes all rows 123 in a data block 122, the manager 215 requests the next data block in the table partition (i.e., the manager 215 sends a cache call). A query 205 that is a resource intense parallel query will cause the data access manager 215 to process each data block 122 in the table 121, at multiple times.

The partition data access manager 215 can launch one or more prefetch helper processes 220 (or threads 220) that can perform concurrent sequential data read operations across the storage volume 120 in response to a query 205. The prefetch helper processes 220 obtains data blocks from disks in the storage volume 120 as requested by a query 205. The prefetch helper processes 220 may perform read ahead (prefetching of the data blocks from the table partition 212 to the data cache buffers 124). The helper processes 220 may also perform various standard functions such as, for example, data sorts, data merging, table joins, and/or other operations that are performed in a database system. Other standard operations that may be performed by the data access manager 215 and the helper processes 220 are discussed in the above-cited commonly-assigned U.S. Pat. No. 6,895,585.

The master executor 210, data access manager 215, partition data access manager 215a (FIG. 2B) and helper processes 220 may be programmed by use of known programming languages such as, e.g., C or C++, and may be programmed by use of standard programming techniques.

The SQL query will typically access and process one or more rows which reside in one or more tables. Complex queries that join rows together across multiple tables can process large numbers of rows. Many queries are bounded in the number of rows they can process, and cannot consume system resources beyond the bounded limit. For example, a query which aggregates a column value over a single table will make a single pass over the rows of the target table.

A query which requires multiple passes over the same data blocks set has the potential to consume system resources for an extended period of time. This is often a reasonable solution for the query, especially when the data blocks set subject to multiple passes is compact or the number of passes over the data is limited. In some cases, the query plan which performs multiple passes over the same data set can consume system resources for an extended period of time. Such a query is typically the result of poor plan quality, and remedial action is required. This includes ending the offending query, and updating the table statistics to ensure poor cardinality is eliminated prior to query execution.

The query execution data flow includes a helper process 220 performing the same pass (i.e., data read operation) over the same data set (in the storage volume 120) or a group of helper processes 220 may be performing a pass over the same data sets in the storage volume 120.

A problem that can occur in previous approaches is that a resource intense query has continued to consume system resources without any limits. These conditions can lead to a starvation situation, where other queries at the same or lower data-access priority are either starved or significantly slowed. These problems are solved by the features in embodiments of the invention as discussed below.

Figure 3:
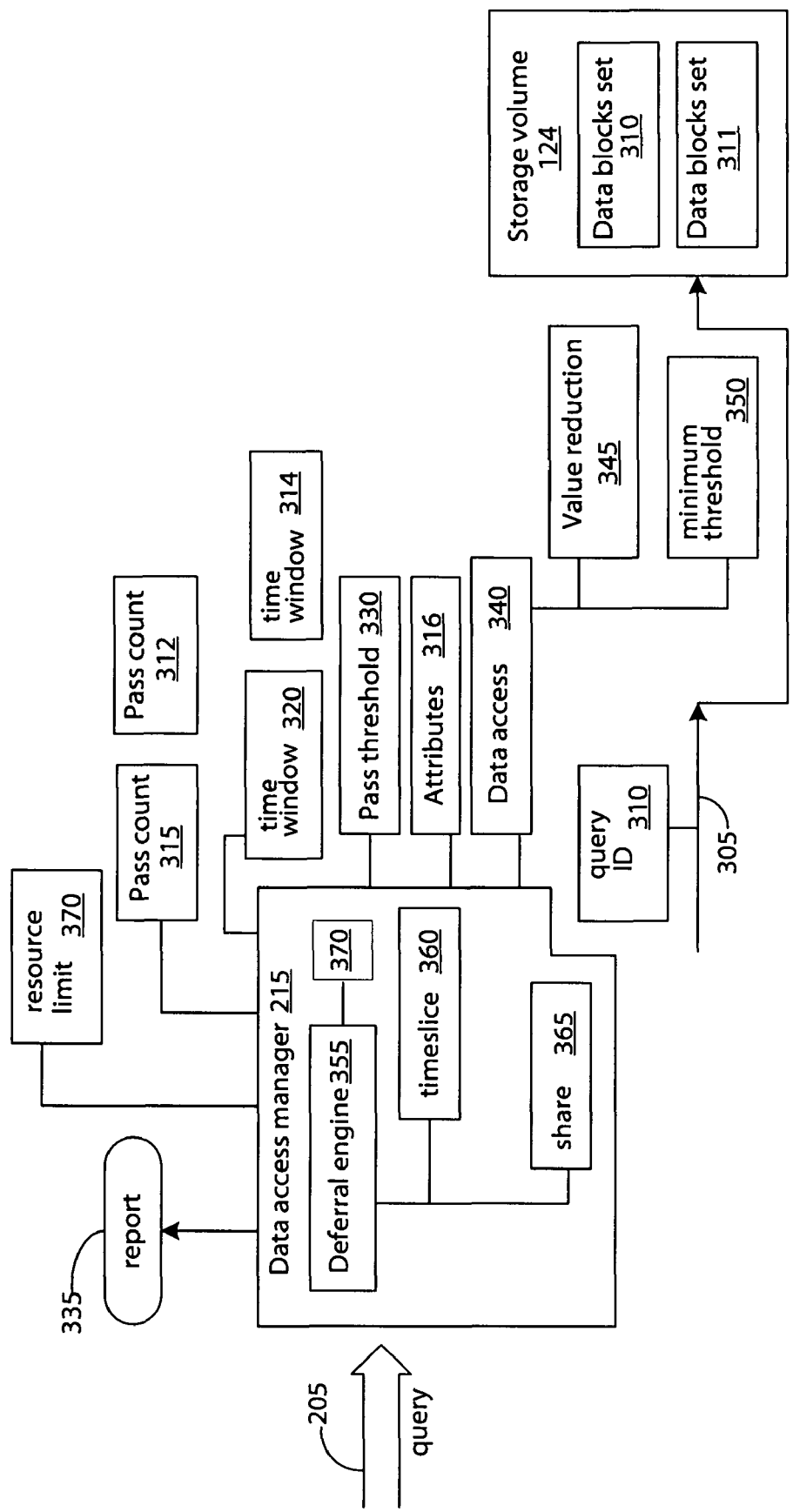
FIG. 3 is a block diagram that shows additional details of a data access manager in accordance with an embodiment of the invention.

FIG. 3 shows additional details of an operation of the data access manager 215, in accordance with an embodiment of the invention. As mentioned above, a table join operation, in response to a query 205, may involve many passes over a large data set in the buffers 124, and such query 205 can result in a workload starvation for extended periods of time for other queries. Other types of data access over data sets in the buffers 124 in storage volume 120 (or in disks in volume 120) can be also be resource intense and therefore result in a workload starvation of other queries.

In an embodiment of the invention, the data access manager 215 detects, reports, and impacts such a query that is resource intense, in order to prevent workload starvation. Specifically, the data access manager 215 examines the number of passes over a data set (e.g., data blocks set 310) in the buffers 124 (or in disks in volume 120 in the case of a cache miss0, over a given time window, in order to determine if a query is a resource intense query, as discussed below.

When the server 115 (FIG. 1) receives a query 205, a data access manager 215 will issue cache calls 305 to the data cache buffers 124 that stores the prefetched data blocks 122 (FIG. 2B), so that the data access manager 215 can access and read the data blocks in a data blocks set 310 in response to the query 205. The data block is located in a cache buffer 122, which is a memory space location in the storage volume 120. If the data block is not located in cache memory 124 (i.e., a cache miss occurrence), it must be read from disk in storage volume 120. The data access manager 215 assigns a query identifier (ID) 310 to each cache call 305, in order to indicate that the cache call 305 is in response to (and is associated with) the query 205. The tracking will not distinguish between the requirement to read from disk (cache miss) or not (cache hit). Cache calls represent a pass over the rows within the data block associated with the cache call. The data access manager 215 tracks a pass count value 315 which is the number of times that the cache call 305 has passed over (i.e., has accessed) the particular data blocks set 310, within a time window 320. The data blocks set 310 will be an entire table. However, it is within the scope of embodiments of the invention to define the data blocks set 310 to other data sizes. Therefore, if the cache call 305 has accessed all data blocks in the data blocks set 310 only once within a given time window 320, then the pass count 315 is at value "1". If the cache call 305 has accessed the data blocks in data blocks set 310 twice within a given time value 320, then the pass count 315 is at value "2".

Alternatively, the pass count 315 is a count of the number of data blocks accessed by the cache call 305 in the data blocks set 310. When the number of accessed data blocks exceeds the total number of data blocks in the data set 310, then a single data pass (i.e., data block access) has been completed by the cache call 305 across that data blocks set 310. Other variations in the pass count 315 may be used for purposes of tracking the number of data passes that are made by the cache call 305 across a data blocks set 310.

If the cache call 305 accesses another data blocks set 311 in the buffers 124 (or in disks 125 in storage volume 120 during a cache miss), then the data access manager 215 tracks the pass count 312 for that set 311, within the time window 314. Therefore, the pass count 312 and the time window 314 are associated with the data blocks set 311. Also, for other cache calls (not shown in FIG. 3) that are associated with other queries (not shown in FIG. 3), the data access manager 215 will maintain a pass count and time window for each of those other cache calls. In the example of FIG. 3, only one cache call 305 is shown for purposes of clarity.

The time length in the time window 320 will depend on the size of the data blocks set 310. For example, for relatively larger sizes (e.g., 900 megabytes) of the data blocks set 310, the time value 320 is set at relatively larger values (e.g., 2 seconds). The time window 320 may be varied in time value. For relatively smaller sizes (e.g., 50 megabytes) of the data blocks set 310, the time window 320 is set at relatively smaller values (e.g., 2 milliseconds). The time value 320 is set at relatively larger time values for relatively larger sized data blocks sets and is set at relatively smaller time values for relatively smaller sized data blocks sets because data access across all data blocks in larger sized data blocks sets will take longer to perform. Note that each pass of a cache call 305 across the data blocks will involve the resource cost associated with disk input/output resources, use of CPU resources, and data transport resources.

The data access manager 215 is aware of the memory space boundaries of a data blocks set (e.g., sets 310 and 311) by use of attributes 316. Therefore, the data access manager 215 can detect when a cache call 305 has accessed the memory spaces in the particular data blocks set 310 in buffers 124 (or/and in disks 125 in the storage volume 120). The data access manager 215 is aware of the data blocks set that is associated with each of the table partitions 212 by use of standard storage access tracking methods that are well known to those skilled in the art. A query can cover an entire table or a set of tables.

When the number of passes by the cache call 305 over a data blocks set (e.g., set 310 or 311) has exceeded a data pass threshold value 330 within the time window 320, then the data access manager 215 will classify the query 205 (which is associated with the cache call 305) as a "speeding" query. A speeding query is defined as a resource intense query that can potentially starve other queries that are being handled by the data access manager 215. The data pass threshold value 330 may be set to any suitable values. For example, the threshold value 330 may be set to "100" passes if the data blocks set 310 is at an example size of approximately 100 megabytes. If the cache call 305 has made more than 100 passes over the data blocks set 310 within the time window 320 (e.g., 2 seconds), then other cache calls for other queries that may be attempting to access the set 310 might be potentially starved because these other cache calls will not be able to access the set 310 due to the access of the cache call 305 to the same set 310 or/and due to the use of disk I/O resources by the cache call 305. Alternative, these other queries may not be able to obtain at least one of disk input/output resources, CPU resources, or data transport resources because at least one of these resources are being used by the speeding query.

A cache call for a particular query may potentially make hundreds of passes over a data blocks set before the data access manager 215 will classify the particular query as a speeding query. As noted above, the data pass threshold 330 and the time window 320 are set to values that permit the data access manager 215 to determine if a query will be classified as a speeding query. The time window 320 and data pass threshold 330 are therefore used to avoid a false positive identification of a speeding query.

When the data access manager 215 has classified a query 205 as a speeding query, the manager 215 could take at least one of various responses. First, the manager 215 can generate a report 335 that can be analyzed by a user (e.g., data base administrator). The report 335 identifies, for example, the query 205 type, the data blocks that are passed by the cache call 305, and/or other information that is associated with the speeding query. The user can then use the information in the report 335 to create rules in the server 215 that apply to this type of speeding query. For example, the user can create filters for this type of speeding query, or can program the data access manager 215 to lower a data access priority value for this type of speeding query when the query is received by the server 215. Other types of rules may be formulated by the user to create known responses for this type of speeding query.

Alternatively or additionally, when the data access manager 215 has classified a query 205 as a speeding query, the manager 215 can respond by reducing the query data access priority 340 that is assigned to the query 205. The query data access priority is the priority of the query in access to data that are managed by the server 115. The query data access priority 340 is also known as a "transaction priority" as discussed in the above-cited commonly-assigned U.S. Pat. No. 6,895,585. The range of data access priorities 340 can be from "1" to "255", with "1" being the highest priority value and "255" being the lowest priority value.

In an embodiment of the invention, the query data access priority 340 is reduced by a given decrement value 345 that may be preset. For example, the query data access priority 340 will be reduced by "5", although other decrement values 345 can be used (e.g., "10" or "15"). For each additional pass that the cache call 305 performs on the data blocks set 310, above the pass threshold value 330 (value of "100" in the above example), the data access manager 215 will reduce the query data access priority 340 of the query 205 by the decrement value of "5". Allowing the query 205 to continue to execute at a reduced priority value 340 ensures that the resource intense query (speeding query) does not starve other queries in the query workload of the data access manager 215 for extended periods of time.

In an embodiment of the invention, the data access manager 215 can also adjust the decrement value 345 so that the decrement value 345 is adaptive. For example, if the data access manager 215 is detecting many resource intense queries that are being classified as speeding queries, the manager 215 can adaptively increase the decrement value 345 from "5" to, for example, "20" so that a speeding query is decreased in transaction priority 340 at a faster rate, resulting in a decreased potential workload starvation for other queries. Alternatively or additionally, a user can configure or preset the decrement value 345 to any suitable value or can even disable this decrement value 345 (e.g., setting the decrement value to "0") so that a speeding query is not reduced in transaction priority 340.

As noted above, the data access priority 340 of a speeding query is reduced for every pass over a data blocks set (e.g., set 310). As the data access priority 340 is reduced for the speeding query, other queries (that are concurrently being handled by the data access manager 215 and are blocked by the speeding query) will begin to obtain CPU resource cycles and the data flow for the speeding query will slow down in rate. When the data access priority 340 of a speeding query falls to or below a minimum threshold 350, the speeding query will be throttled by a deferral engine 355, depending on whether or not there is contention by other queries for the resource(s) (e.g., data blocks set, disk I/O resources, CPU resources, and/or data transport resources) that are being consumed by the speeding query. In another embodiment of the invention, only the contention for disk I/O resources (i.e. physical accesses to the disks 125) are taken into account when the priority falls to or below the minimum threshold 350, because the cost in terms of, for example, a throughput rate decrease, is more significant with contentions for disk I/O resources than with contentions for CPU resources during context switching. For example, if there is no contention by other queries for the resource(s) being consumed by the speeding query and the priority 340 has fallen to or below the minimum threshold 350, then the speeding query will continue to execute until the data access manager 215 has completed in processing the speeding query, or until the data access manager 215 stops execution of the speeding query due to, for example, the speeding query exceeding resource limits (as discussed below). In contrast, if there is contention by other queries for the resource(s) being consumed by the speeding query and the priority 340 has fallen to or below the minimum threshold 350, then the deferral engine 355 will perform a throttling of the speeding query. When the speeding query is throttled, the speeding query will be able to use the contended resource (e.g., CPU time, disk I/O resources, data transport resources, or access to data blocks) at less than a timeslice value 360. For example, the throttled speeding query will be able to use the contended resource at a percentage (e.g., 50%) of the timeslice 360. Therefore, as an example, if the timeslice 360 is one second, the throttled speeding query can use the contended resource for approximately 0.5 seconds of the one second value of the timeslice 360. The share 365 of the timeslice 360 can be adaptive or preset. For example, the data access manager 215 can adaptively adjust the value of the share 365 based on the current priority value 340 of the throttled speeding query or a user can preset the value of the share 365. If the priority value 340 is closer to, for example, "100", then the share 365 can be set at a relatively higher value (e.g., 80% of the timeslice 360). If the priority value 340 is closer to, for example, "1" or other values of the minimum threshold 350, then the share 365 can be set at a relatively lower value (e.g., 10% of the timeslice 360). The deferral engine 355 can maintain the speeding query in a throttled state as long as there is contention for a resource between the speeding query and another query. Typically, when the deferral engine 355 places a speeding query into the throttled state, the deferral engine 355 will place the speeding query in a throttle queue 370 when the speeding query is not consuming its share 365 of the timeslice 360.

The minimum threshold 350 can be configured (preset) by a user or can be adaptively adjusted by the data access manager 215. As noted above, this minimum threshold determines when a speeding query is eligible for throttling.

Therefore, the amount of the access priority decrement value can be configured based on different factors as discussed above, and the possible different techniques for triggering an access priority decrement for a query and for eventually placing a query in the throttled state, are also discussed above.

In an embodiment of the invention, as an option, resource limits 370 can be assigned by the data access manager 215 to resources. If a query exceeds a given resource limit, then the data access manager 215 can stop the execution of the query. As an example of a resource limit 370, if the pass count 315 for a query 205 exceeds, for example, a value of "500" passes on a data set 310 within the time window 320, then the manager 215 can be configured to stop the execution of this query 205 because the query has exceeded this resource limit of "500" passes on the data set 310 within the time window 320. In this case, the query 205 has exceeded the pass threshold 330 which is a situation that normally will trigger the above-discussed response of, for example, generating the report 335 and/or reducing the transaction priority 340 of the query 205. However, additionally in this case, the pass count 315 has also exceeded an upper bound of the pass count as set in the resource limit values 370. This excessive amount in the pass count 315 for the query 205 has resulted in a non-optimal servicing of the query 205 and it may be advantageous to eliminate the reduced throughput by stopping the execution of the query 205. This optional use of resource limits 370 can be integrated with the use of the above-responses to speeding queries. Other types of resource limits 370 include, for example, a limit on use of CPU time by a query 205.

Embodiments of the invention advantageously control the servicing of query workloads and can improve data throughput by identifying and responding to resource intense queries.

Figure 4:
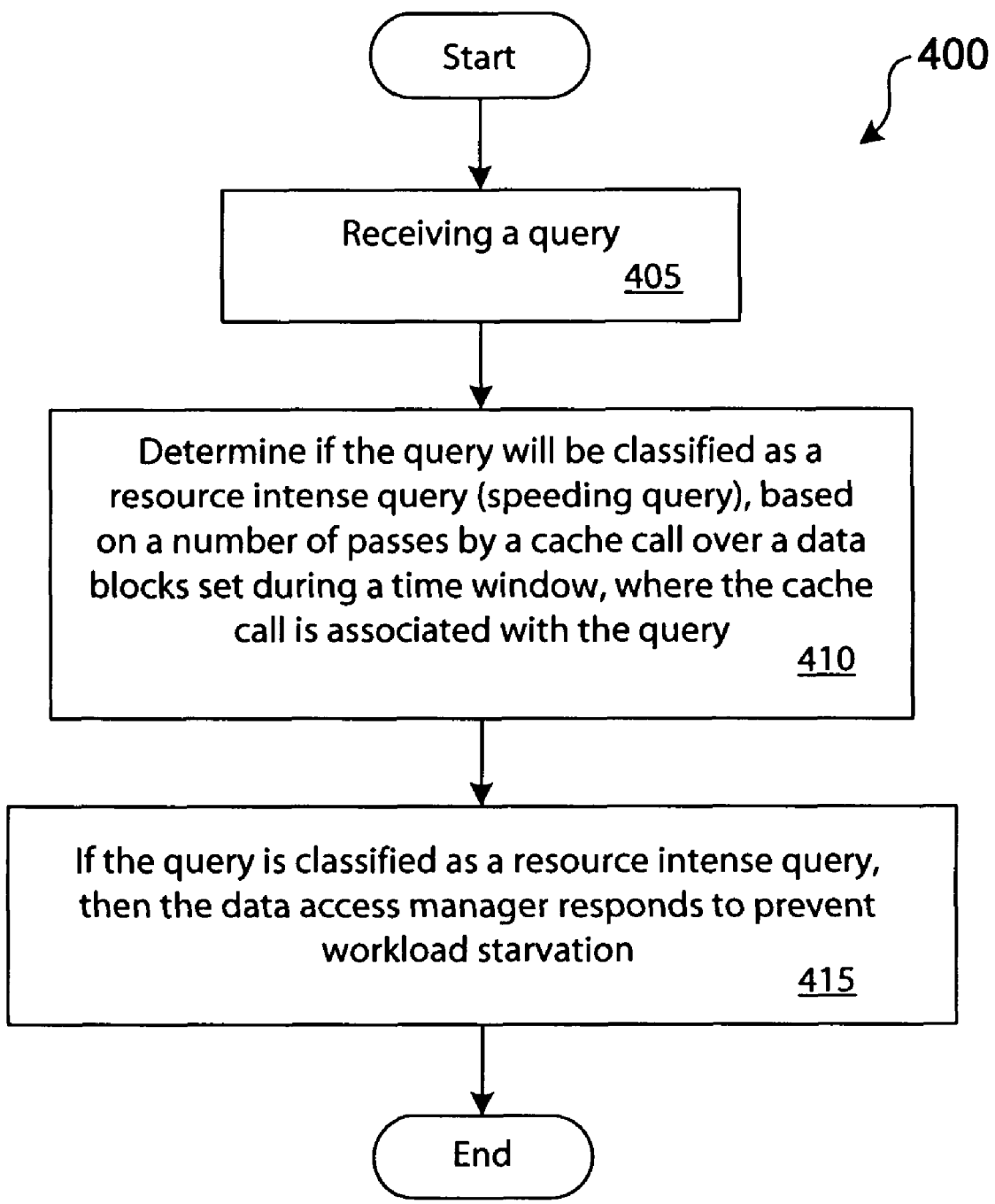
FIG. 4 is a flow diagram of a method in accordance with an embodiment of the invention.

FIG. 4 is a flow diagram of a method 400 in accordance with an embodiment of the invention. In block 405, the data access manager 215 (FIG. 3) receives a query 205.

In block 410, the data access manager 215 determines if the query will be classified as a resource intense query (speeding query), based on a number of passes by a cache call over a data blocks set during a time window, where the cache call is associated with the query.

In block 415, if the data access manager 215 classifies the query as a resource intense query, then the data access manager 215 responds to prevent workload starvation. As discussed above, the data access manager can respond by generating a report that can be used to create rules that the data access manager 215 can apply to this type of resource intense query. Alternatively or additionally, when the data access manager 215 has classified a query 205 as a speeding query, the manager 215 can respond by reducing the query data access priority 340 that is assigned to the query 205. Other variations in the manner of decrementing the data access priority of a query have been discussed above.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for detecting resource consumption and preventing workload starvation, the method comprising:
    receiving a query for reading data from a data blocks set;
    determining if the query will be classified as a resource intense query, wherein the determining is based on a number of read passes by a cache call over the data blocks set during a time window, wherein the determining further comprises comparing the number of read passes over the data blocks set with a pass threshold value during the time window, wherein a value of the time window is dependent on a data size of the data blocks set, and wherein the cache call is associated with the query; and
    if the query is classified as a resource intense query, then responding to prevent workload starvation.

2. The method of claim 1, wherein the comparing further comprises varying the pass threshold value.

3. The method of claim 1, wherein the act of responding comprises generating a report that can be used to create rules to apply to the resource intense query.

4. The method of claim 1, wherein the act of responding comprises reducing a data access priority of the resource intense query.

5. The method of claim 4, further comprising: reducing the data access priority by a decrement value.

6. The method of claim 5, further comprising: presetting the decrement value by a user.

7. The method of claim 5, further comprising: dynamically adjusting the decrement value.

8. The method of claim 5, further comprising: disabling the decrement value.

9. The method of claim 4, further comprising: performing a throttle of the query if the data access priority falls to a minimum threshold value and contention of a resource is occurring.

10. The method of claim 9, wherein the query will consume the resource during a share of a timeslice value, if the query is in a throttled state.

11. The method of claim 10, wherein the share of the timeslice value is an adjustable value.

12. The method of claim 1, wherein the responding to prevent the workload starvation further comprises: stopping an execution of the query if the query exceeds a resource limit.

13. An apparatus for detecting resource consumption and preventing workload starvation, the apparatus comprising:
    a central processing unit;
    a data access manager configured
        to receive a query for reading data from a data blocks set,
        to determine if the query will be classified as a resource intense query, wherein the determining is based on a number of read passes by a cache call over the data blocks set during a time window, wherein the determining further comprises comparing the number of read passes over the data blocks set with a pass threshold value during the time window, wherein a value of the time window is dependent on a data size of the data blocks set, and wherein the cache call is associated with the query, and
        to respond to prevent workload starvation if the query is classified as a resource intense query.

14. The apparatus of claim 13, wherein the pass threshold value may be varied in value.

15. The apparatus of claim 13, wherein the data access manager is configured to generate a report that can be used to create rules to apply to the resource intense query.

16. The apparatus of claim 13, wherein the data access manager is configured to reduce a data access priority of the resource intense query.

17. The apparatus of claim 16, wherein the data access manager is configured to reduce the data access priority by a decrement value.

18. The apparatus of claim 17, wherein the decrement value is preset by a user.

19. The apparatus of claim 17, wherein the data access manager is configured to dynamically adjust the decrement value.

20. The apparatus of claim 17, wherein the decrement value is disabled by a user.

21. The apparatus of claim 16, wherein the data access manager is configured to perform a throttle of the query if the data access priority falls to a minimum threshold value and contention of a resource is occurring.

22. The apparatus of claim 21, wherein the query will consume the resource during a share of a timeslice value, if the query is in a throttled state.

23. The apparatus of claim 22, wherein the share of the timeslice value is an adjustable value.

24. The apparatus of claim 13, wherein the data access manager is configured to stop an execution of the query if the query exceeds a resource limit as a part of the responding to prevent the workload starvation.

25. An article of manufacture comprising:
    a non-transitory machine-readable medium having stored thereon instructions to:
        receive a query for reading data from a data blocks set;
        determine if the query will be classified as a resource intense query, wherein the determining is based on a number of read passes by a cache call over the data blocks set during a time window, wherein the determining further comprises comparing the number of read passes over the data blocks set with a pass threshold value during the time window, wherein a value of the time window is dependent on a data size of the data blocks set, and wherein the cache call is associated with the query; and
        respond to prevent workload starvation, if the query is classified as a resource intense query.

26. An apparatus for detecting resource consumption and preventing workload starvation, the apparatus comprising:
    a central processing unit;
    means for receiving a query for reading data from a data blocks set;
    means for determining if the query will be classified as a resource intense query, wherein the determining is based on a number of read passes by a cache call over the data blocks set during a time window, wherein the determining further comprises comparing the number of read passes over the data blocks set with a pass threshold value during the time window, wherein a value of the time window is dependent on a data size of the data blocks set, and wherein the cache call is associated with the query; and
    means for responding to prevent workload starvation, if the query is classified as a resource intense query.

* * * * *